Patented June 30, 1931

1,812,541

UNITED STATES PATENT OFFICE

JULIUS A. NIEUWLAND, OF NOTRE DAME, INDIANA, ASSIGNOR TO E. I. DU PONT DE NEMOURS & COMPANY, OF WILMINGTON, DELAWARE, A CORPORATION OF DELAWARE

RESINOUS PRODUCT AND PROCESS OF PREPARING THE SAME

No Drawing.   Application filed January 4, 1929.   Serial No. 330,415.

This invention relates to new chemical compounds and the process of preparing the same. More particularly, it relates to the products derived from polymerizable polymers of acetylene by further polymerization in the presence of air.

This application is a continuation in part of an application Serial No. 259,606, filed March 6, 1928, of the same applicant.

It has been shown in a previous application of applicant, Serial No. 153,210, filed December 7, 1926, that by passing acetylene into a mixture of ammonium chloride, water, cuprous chloride and copper powder, unsaturated hydrocarbons of higher molecular weight are formed and may be separated by distilling them from the catalyst mixture. The water driven over during the distillation process is returned to the catalyst mixture which is then ready for retreatment with acetylene. The major product is a low boiling (80–85° C.) highly unsaturated oil, called divinylacetylene and having most probably the empirical formula $C_6H_6$, but there is also produced, at the same time, a substantial quantity of other polymerizable acetylene polymers of indefinite constitution. Two of these other polymers have probably the empirical formula $C_8H_8$ and $C_4H_4$, respectively. This last product has been definitely identified as monovinyl acetylene. These products may be roughly separated by distillation The present invention relates to the discovery that the mixture obtained as above, or the separated constituents thereof, under the influence of heat or by aging at ordinary temperatures, in the presence of air, further polymerize successively to an oily, then to a gelatinous, then to a resinous mass and finally yield a hard brittle resin having unusual resistance to the action of water and organic solvents. The oily product which is first formed is largely soluble in alcohol and acetone: the gelatinous polymer modification next formed is largely soluble in acetone but partly insoluble in alcohol; the resinous modification next formed is substantially insoluble in alcohol and slightly soluble in acetone, while the subsequent hard, brittle polymers are substantially insoluble in both alcohol and acetone. It will be understood that these successive polymerization products consist of a mixture of volatile and non-volatile compounds in various stages of polymerization, which compounds may be only roughly separated by dissolving but may be separated by distillation.

The reaction is rapid so that the original hydrocarbons obtained from the acetylene polymerization when placed in a sealed container such as a glass tube may be completely converted to acetone insoluble resins in from 18 to 20 hours at 90–100° C. The reaction may be interrupted at earlier stages in order to obtain good yields of the oily, alcohol soluble polymer or of the acetone soluble polymer. After the removal of the solvent the soluble polymers may be dispersed in a volatile swelling solvent such as benzene or in water by effecting emulsification according to the well known methods.

In order to disclose the invention in its more specific details, examples of actual embodiments thereof are given below. It is to be understood, however, that these examples merely illustrate preferred methods of carrying out the invention. Applicant is not to be limited to the exact proportions and conditions therein specified. Thus by lowering the temperature and increasing the time or by raising the temperature and suitably decreasing the duration of treatment products of substantially the same degree of polymerization as those of the examples may be produced.

Example 1

Place 25 cc. of a mixture of unsaturated hydrocarbons obtained from acetylene as described and containing divinylacetylene in a pyrex glass tube, leaving 50 cc. of air space over the liquid, seal the tube and immerse it in a boiling water bath for 24 hours. A hard cake of resin results which is insoluble in acetone and the usual organic solvents.

Example 2

Heat 250 cc. of the mixture of unsaturated hydrocarbons obtained from acetylene under a reflux condenser to 85°–87° C. for 16 hours using a water bath. A stiff gel is obtained which is slightly soluble in acetone but substantially insoluble in alcohol.

Example 3

Heat 250 cc. of a mixture of unsaturated hydrocarbons obtained from acetylene as described and containing divinylacetylene under a reflux condenser to 85°–87° C. for three hours, using a water bath. Remove the unchanged hydrocarbons by distillation in vacuo. A viscous or gelatinous product results which is almost completely soluble in acetone but only partly soluble in alcohol and which consists of a mixture of the alcohol soluble and acetone soluble modifications which may be separated by extraction.

Example 4

Heat 250 cc. of divinylacetylene under a reflux condenser to 85°–87° C. for three hours using a water bath. Remove the unchanged divinylacetylene by distillation under vacuum. A gel results which is largely soluble in acetone.

Example 5

Heat 250 cc. of the mixture of unsaturated hydrocarbon obtained from acetylene under a reflux condenser to 85°–87° C. for about two hours. An oily product is obtained which is largely soluble in both alcohol and acetone.

Care must be exercised in handling the polymerization products since they are highly inflammable and the viscous or gelatinous masses are capable of absorbing oxygen from the air to yield explosive derivatives capable of spontaneously igniting the bulk of the material. If heated above 113° C. an explosion normally results.

The alcoholic or acetone solutions of the soluble ploymers or the dispersions of these polymers yield, upon the removal of the solvent and subsequent polymerization, films of resin having unusual resistance to water and solvents.

As many apparent and widely different embodiments of this invention may be made without departing from the spirit and scope thereof, it is to be understood that I do not intend to be limited except as defined in the appended claims.

I claim:

1. A liquid polymerization product of a low boiling non-viscous non-benzenoid polymerizable polymer of acetylene, said liquid product being obtainable by heating the acetylene polymer to a temperature not in excess of 113° C.

2. A polymerization product of a non-benzenoid low-boiling non-viscous polymerizable polymer of acetylene obtainable by exposing said polymer of acetylene to air and heating to a temperature not in excess of 113° C.

3. A ploymerization product of a non-benzenoid low-boiling non-viscous polymerizable polymer of acetylene obtainable by exposing said polymer of acetylene in the presence of oxygen to a temperature of substantially 85°–87° C. for at least two hours.

4. A polymerization product of a non-benzenoid low-boiling non-viscous polymerizable polymer of acetylene obtainable by exposing said polymer of acetylene in the presence of oxygen to a temperature of substantially 85°–87° C. for at least 16 hours.

5. A ploymerization product of divinylacetylene.

6. A ploymerization product of divinylacetylene, a part of which product is insoluble in acetone.

7. A polymerization product of divinylacetylene, the greater part of which product is insoluble in actone.

8. The process of preparing a polymerization product of polymerizable polymers of acetylene which comprises exposing a volatile non-viscous non-benzenoid polymerizable polymer of acetylene to air and applying heat up to 113° C.

9. The process of preparing a polymerization product of polymerizable polymers of acetylene which comprises heating a volatile non-viscous non-benzenoid polymerizable polymer of acetylene in the presence of air to a temperature of substantially 85°–87° C. for at least two hours.

10. The process of preparing a polymerization product of polymerizable polymers of acetylene which comprises heating a volatile non-viscous non-benzenoid polymerizable polymer of acetylene in the presence of air to a temperature of substantially 85°–87° C. for at least 16 hours.

11. In the preparation of a polymerization product of divinylacetylene, the step which comprises exposing the divinylacetylene to oxygen.

12. The process of preparing a polymerization product of divinylacetylene which comprises exposing the divinylacetylene to air and applying heat up to 113° C.

13. The process of preparing a polymerization product of divinylacetylene which comprises heating the divinylacetylene in the presence of air to a temperature of substantially 85°–87° C. for at least three hours.

14. The process of obtaining a polymerizable unsaturated hydrocarbon from acetylene which comprises passing acetylene into a mixture of ammonium chloride, water, cuprous chloride and copper powder to obtain a volatile non-viscous liquid acetylene polymer and thereafter heating said polymer in the presence of air to effect the further polymerization of said acetylene polymer.

15. The process of obtaining a polymerizable unsaturated hydrocarbon from acetylene which comprises passing acetylene into a mixture of ammonium chloride, water, cuprous chloride and copper powder to obtain a mixture of volatile non-viscous liquid acetylene polymers, separating the divinylacetylene from the resulting mixture by distillation and thereafter heating the divinylacetylene in the presence of air to effect the further polymerization of the divinylacetylene.

16. The process of obtaining a polymerizable unsaturated hydrocarbon from acetylene which comprises passing acetylene into a mixture of ammonium chloride, water, cuprous chloride and copper powder to obtain a mixture of volatile non-viscous liquid acetylene polymers, separating the divinylacetylene from the resulting mixture by distillation and thereafter heating the divinylacetylene to substantially 85° C. in the presence of air to effect the further polymerization of the divinylacetylene.

17. A polymerizable unsaturated hydrocarbon obtained by passing acetylene into a mixture of ammonium chloride, water, cuprous chloride and copper powder to obtain a volatile non-viscous liquid acetylene polymer and thereafter heating said polymer in the presence of air to effect the further polymerization of said acetylene polymer.

18. The polymerizable unsaturated hydrocarbon obtained by passing acetylene into a mixture of ammonium chloride, water, cuprous chloride and copper powder to obtain a mixture of volatile non-viscous liquid acetylene polymers, separating the divinylacetylene from the resulting mixture by distillation and thereafter heating the divinylacetylene in the presence of air to effect the further polymerization of the divinylacetylene.

19. The polymerizable unsaturated hydrocarbon obtained by passing acetylene into a mixture of ammonium chloride, water, cuprous chloride and copper powder to obtain a mixture of volatile non-viscous liquid acetylene polymers, separating the divinylacetylene from the resulting mixture by distillation and thereafter heating the divinylacetylene to substantially 85° C. in the presence of air to effect the further polymerization of the divinylacetylene.

20. The process of polymerizing a mixture of polymerizable polymers of acetylene containing monovinyl acetylene which process comprises heating said mixture to a temperature not in excess of 113° C.

21. In the process of polymerizing a polymerizable polymer of acetylene having the empirical formula $C_4H_4$ the step of heating said polymer to a temperature not over 113° C.

22. In the process of polymerizing monovinyl acetylene the step of heating the same to a temperature not over 113° C. in the presence of air.

23. A polymerization product obtained by polymerizing a mixture of polymerizable acetylene polymers containing monovinyl acetylene.

24. A product comprising polymerized monovinyl acetylene.

25. In the process of polymerizing an unsaturated polymer prepared from acetylene by passing acetylene into a mixture of ammonium chloride, water, cuprous chloride and copper powder, the step of heating to a temperature below 113° C. to accelerate polymerization.

In testimony whereof, I affix my signature.

JULIUS A. NIEUWLAND.